US011083207B2

(12) United States Patent
Fischer et al.

(10) Patent No.: US 11,083,207 B2
(45) Date of Patent: Aug. 10, 2021

(54) DECAFFEINATION METHODS AND SYSTEMS

(71) Applicant: INFRÉ SA, Semsales (CH)

(72) Inventors: Norbert Fischer, Zufikon (CH); Carlo Weber, Zurich (CH)

(73) Assignee: INFRÉ SA, Semsales (CH)

(*) Notice: Subject to any disclaimer, the term of this patent is extended or adjusted under 35 U.S.C. 154(b) by 275 days.

(21) Appl. No.: 16/459,063

(22) Filed: Jul. 1, 2019

(65) Prior Publication Data

US 2019/0320676 A1 Oct. 24, 2019

Related U.S. Application Data

(62) Division of application No. 15/128,991, filed as application No. PCT/EP2015/055548 on Mar. 17, 2015, now Pat. No. 10,426,178.

(30) Foreign Application Priority Data

Mar. 26, 2014 (GB) .................................. 1405488

(51) Int. Cl.
*A23F 3/38* (2006.01)
*A23F 3/36* (2006.01)

(52) U.S. Cl.
CPC .............. *A23F 3/385* (2013.01); *A23F 3/36* (2013.01)

(58) Field of Classification Search
CPC .................................. A23F 3/385; A23F 3/36
USPC ................................ 426/271, 594, 422, 615
See application file for complete search history.

(56) References Cited

U.S. PATENT DOCUMENTS

| 4,167,589 | A | 9/1979 | Vitzthum et al. |
| 4,298,736 | A | 11/1981 | Katz et al. |
| 4,508,743 | A | 4/1985 | Green et al. |
| 4,976,979 | A | 12/1990 | Klima et al. |
| 5,208,056 | A | 5/1993 | Fischer et al. |
| 5,827,560 | A | 10/1998 | Fu et al. |
| 7,160,369 | B2 | 1/2007 | von Blucher et al. |
| 7,662,747 | B2 | 2/2010 | De Ruiter |
| 8,704,033 | B2 | 4/2014 | Mullejans et al. |
| 2004/0038802 | A1 | 2/2004 | von Blucher et al. |
| 2009/0047408 | A1 | 2/2009 | Unno et al. |

(Continued)

FOREIGN PATENT DOCUMENTS

| CN | 101541185 A | 9/2009 |
| CN | 101686701 A | 3/2010 |

(Continued)

OTHER PUBLICATIONS

Feb. 4, 2019 Office Action issued in Russian Patent Application No. 2016131496/10(048985).

(Continued)

*Primary Examiner* — Helen F Heggestad
(74) *Attorney, Agent, or Firm* — Oliff PLC

(57) ABSTRACT

Disclosed is a water based method for extracting caffeine from alkaloid containing substances, in particular tea leaves. The method can be performed without the use of artificial substances. The method allows the other soluble, non-caffeine components of alkaloid containing substances to be part of the decaffeinated product, in particular, components such as catechins and antioxidants. Advantageously, the caffeine extracted from the alkaloid containing substances is reversibly adsorbed to an adsorbent and high percentile of the caffeine can be recovered from the adsorbent.

1 Claim, 2 Drawing Sheets

(56) References Cited

U.S. PATENT DOCUMENTS

| | | |
|---|---|---|
| 2010/0021615 A1 | 1/2010 | Sato et al. |
| 2010/0136205 A1 | 6/2010 | Konishi |
| 2012/0172216 A1 | 7/2012 | Bohringer et al. |
| 2012/0308712 A1 | 12/2012 | Sasame et al. |
| 2013/0261136 A1 | 10/2013 | Chu et al. |

FOREIGN PATENT DOCUMENTS

| | | |
|---|---|---|
| CN | 102178012 A | 9/2011 |
| CN | 102702162 A | 10/2012 |
| CN | 107624887 A | 1/2018 |
| EP | 0 040 712 A1 | 12/1981 |
| EP | 0 167 399 A2 | 1/1986 |
| EP | 0 200 150 A2 | 11/1986 |
| EP | 0 248 482 A1 | 12/1987 |
| EP | 0 457 539 A1 | 11/1991 |
| EP | 0666033 A1 | 8/1995 |
| EP | 2095718 A1 | 9/2009 |
| GB | 403 868 A | 1/1934 |
| JP | S55-029995 A | 3/1980 |
| JP | S57-012952 A | 1/1982 |
| JP | S63-022145 A | 1/1988 |
| JP | H04-218501 A | 8/1992 |
| JP | H08-070772 A | 3/1996 |
| JP | 2005-518279 A | 6/2005 |
| JP | 2010-200659 A | 9/2010 |
| SU | 1602385 A3 | 10/1990 |
| WO | 2003/072498 A1 | 9/2003 |
| WO | 2013/169806 A2 | 11/2013 |

OTHER PUBLICATIONS

Ye et al.; "Preparation of Partially Decaffeinated Instant Green Tea;" J. Agric. Food Chem.; 2007; pp. 3498-3502; vol. 55.

Mar. 26, 2019 Office Action issued in Chinese Patent Application No. 201580015484.X.

"Swiss Water® Process;" SwissWater Decaf; Nov. 11, 2010; https://www.youtube.com/watch?v=fHba09QKOi0.

"Swiss Water® Process animation video;" SwissWater Decaf; Sep. 16, 2013; <https://www.youtube.com/watch?v=tAEQ4G-1jTQ>.

"How Do You Decaffeinate Coffee and Tea?"; BrainStuff—HowStuffWorks; Jun. 2, 2013; <https://www.youtube.com/watch?v=uhAJ-zL5-QU>.

Apr. 10, 2019 email communication from European Examiner Rolf Smalt in European Patent Application No. 15713664.9.

Jian-Hui Ye et al., "Preparation of Partially Decaffeinated Instant Green Tea," Journal of Agricultural and Food Chemistry, vol. 55, No. 9, May 1, 2007, pp. 3498-3502, XP055200084.

Anonymous: "How is Tea Decaffeinated? Tea Term of the Month: Decaffeinated", Feb. 9, 2010, XP055200142, URL: http://www.arborteas.com/blog/tea-term-of-the-month-how-is-tea-decaffeinated.

Process Scheme

Legend
→ Main path
→ Side path
CLTE Aqueous extract: "caffeine laden tea extract" (aqueous extract laden with caffeine after extraction)
DTE Decaf tea extract (Caffeine-free tea extract as extraction solvent)
RA Regenerated adsorbent
RDS Recycled desorption solvent
DTw Decaf tea wet (Aqueous tea leaf mixture)

DECAFFEINATION METHODS AND SYSTEMS

This is a Division of application Ser. No. 15/128,991 filed Sep. 26, 2016, which in turn is a National Stage Entry of PCT/EP2015/055548 filed Mar. 17, 2015, which claims the benefit of United Kingdom Patent Application No. 1405488.6 filed Mar. 26, 2014. The disclosure of the prior applications is hereby incorporated by reference herein in its entirety.

FIELD OF THE INVENTION

This invention relates to systems and methods for processing and/or extracting materials from alkaloid containing substances such as tea leaves. A water based method of extracting caffeine from those substances is disclosed that works preferably without the use of artificial, ergo, man-made, chemical solvents. Preferably, the system and method allows the other water soluble, non-caffeine, components (e.g. catechins and polyphenols) of the alkaloid containing substances to be part of the decaffeinated product. Advantageously, the caffeine extracted from the alkaloid containing substances is reversibly adsorbed to an adsorbent and a high level of caffeine can be desorbed from the adsorbent and further used in different fields.

BACKGROUND OF THE INVENTION

The methods and steps employed in the processing of tea leaves from tea plants during decaffeination into decaffeinated tea products have a significant influence on the quality of the resulting tea products, in particular in terms of flavor and/or intensity. The quality is in particular determined by the content of tea catechins (which might make up 30% of the dry weight of tea leaves in green tea), theaflavin derivatives, such as theaflavin-3-gallate, and/or other polyphenols. Thus, the method employed for processing tea leaves into tea products, in particular into decaffeinated tea can be critically important to the commercial viability, success or acceptance of the tea products. Another factor that is important for the commercial viability of such products is in how far the by-products of the decaffeination, in particular the caffeine, can be recovered. Generally, caffeine constitutes about 3% of the dry weight of tea leaves from tea plants, translating to between 30 mg and 90 mg per 8 oz (250 ml) cup depending on type.

Coffee and tea are both alkaloid containing substances. The main alkaloid they contain is the xanthine alkaloid caffeine, ($C_8H_{10}N_4O_2$, 1,3,7-Trimethyl-1H-purine-2,6(3H,7H)-dione), which is moderately soluble in water at room temperature (2 g/100 ml), but very soluble in boiling water (66 g/100 ml). The radius of caffeine molecule is 3.76 Å with the observed hydrodynamic diameter being ~1 nm in caffeine solution.

However, the substances that make tea and coffee attractive to drink differ, apart from the caffeine, substantially. The flavor of tea is primarily determined by water soluble components that can be found in the freshly harvested tea leaves as well as the dried and/or oxidized version thereof. The flavor of coffee on the other hand is primarily determined by the roasting process the coffee is subjected to after the drying of the beans.

Tea or coffee beverages are typically obtained by brewing tea leaves or coffee powder (made from roasted coffee beans) in hot water. The water temperature for brewing tea lies typically between 70 and 100 degrees Celsius, depending on the quality of the tea and the taste desired. Coffee is typically brewed at 100 degrees Celsius or above 100 degrees Celsius and frequently pressure is applied during the extraction of the water soluble components.

Thus, while in tea there are many desirable water soluble components in the fresh, dried and/or oxidized (but unroasted) tea leaf, in coffee most of the water soluble components are only generated during the roasting process, while the green, unroasted, coffee bean only contains as water soluble components, caffeine and a few non-water soluble flavor precursors, which become water soluble during the roasting process.

Accordingly, there is a prominent water based coffee decaffeination process, namely, the "Swiss Water Process." In this process the caffeine is extracted from green, unroasted coffee beans using water. The caffeine is removed from the mixture using active carbon. The decaffeinated coffee beans are dried and roasted. The roasting confers the flavor to the coffee. Generally the caffeine is irreversibly attached to an active carbon.

A typical tea processing procedure begins with the harvest of the tea leaves followed by fermenting and/or drying them. After picking, the leaves of, e.g., *Camelia sinensis* soon begin to wilt and oxidize unless they are immediately dried. The leaves turn progressively darker as their chlorophyll breaks down and tannins are released. This enzymatic oxidation process is caused by the plant's intracellular enzymes and causes the tea to darken. In tea processing, the darkening is stopped at a predetermined stage by heating, which deactivates the enzymes responsible. In the production of black teas, the halting of oxidation by heating is carried out simultaneously with the drying.

A decaffeination process leaves generally some caffeine in the leaf. By law, tea labeled as "decaffeinated" must, in most countries, have less than 2.5 percent of its original caffeine level, which usually equates to less than 2 mg per cup.

Tea decaffeination often uses processes analogous to the "direct method" of coffee decaffeination.

In the direct method, the tea leaves are first steamed for 30 minutes and then repeatedly rinsed with either dichloromethane or ethyl acetate for several hours. The solvent is then drained away and the leaves are steamed for a time sufficient to remove residual solvent. Sometimes teas that are decaffeinated using ethyl acetate are referred to as "naturally processed" because ethyl acetate can be derived from various fruits or vegetables. However, mostly any ethyl acetate used for decaffeination is synthetic, not natural. In addition, the ethyl acetate based process removes many of the aromatic components of tea that are appreciated by consumers. Accordingly, the dichloromethane based decaffeination process is the primary process used for decaffeinating tea.

Decaffeinated teas that are labeled "organic" are often decaffeinated via a carbon dioxide ($CO_2$) based method. Tea decaffeinated using a $CO_2$ method retains 92 percent of its polyphenols (antioxidants) compared to tea decaffeinated using the ethyl acetate process, which only retains 18 percent. In the $CO_2$ decaffeination method, the $CO_2$ used for decaffeination is filtered and recycled at a rate of around 99%. In this method, the tea leaves are essentially "pressure cooked" with $CO_2$. At high pressures and high temperatures, $CO_2$ reaches a supercritical state. The $CO_2$ becomes a solvent that, with its small, nonpolar molecules, attracts the small caffeine molecules. Since "flavor molecules" such as polyphenols are generally larger, they remain intact, which is why this process retains the flavor of the tea well. After passing through the tea leaves, the caffeine-laden $CO_2$ is filtered to remove the caffeine, and then recycled for further use in decaffeination. U.S. Pat. Nos. 4,167,589 and 4,976,979 describe $CO_2$ based decaffeination processes. These patents, as well as any other patent and non-patent publications referred to herein are incorporated herein by reference in their entirety. While $CO_2$ based tea decaffeination processes can be considered as natural, they require expensive equipment and complex process controls.

Both organic solvents generally used for extracting caffeine from tea, namely ethyl acetate and dichloromethane, have a medium polarity that permits dissolution of the caffeine, but minimizes concomitant extraction of polar, more water soluble taste and flavor components. Supercritical carbon dioxide in its liquid state is a moderately nonpolar to medium polar solvent and thus provides certain selectivity for extracting caffeine.

When water is used as a natural solvent, the conditions applied for removing the caffeine from tea leaves, are relatively close to those applied in preparing tea as a beverage and thus can be expected to lead to an concomitant extraction of those water soluble components other than caffeine that majorly contribute to the taste of the final tea product. Thus, one of the challenges of a water based method for extracting tea leaves is to obtain a product that, nonetheless, contains desirable concentrations of water-soluble components that contribute to the taste profile of the final product.

Thus, there remains a need for a "natural" decaffeination process for tea, in particular a water-based process that does not involve chemical extraction of caffeine and that uses relatively simple equipment and/or process controls. There is also a need for recovering the extracted caffeine at high levels. The present invention is directed at achieving this/these and/or other goals and/or objectives.

SUMMARY OF THE INVENTION

Figure 1:
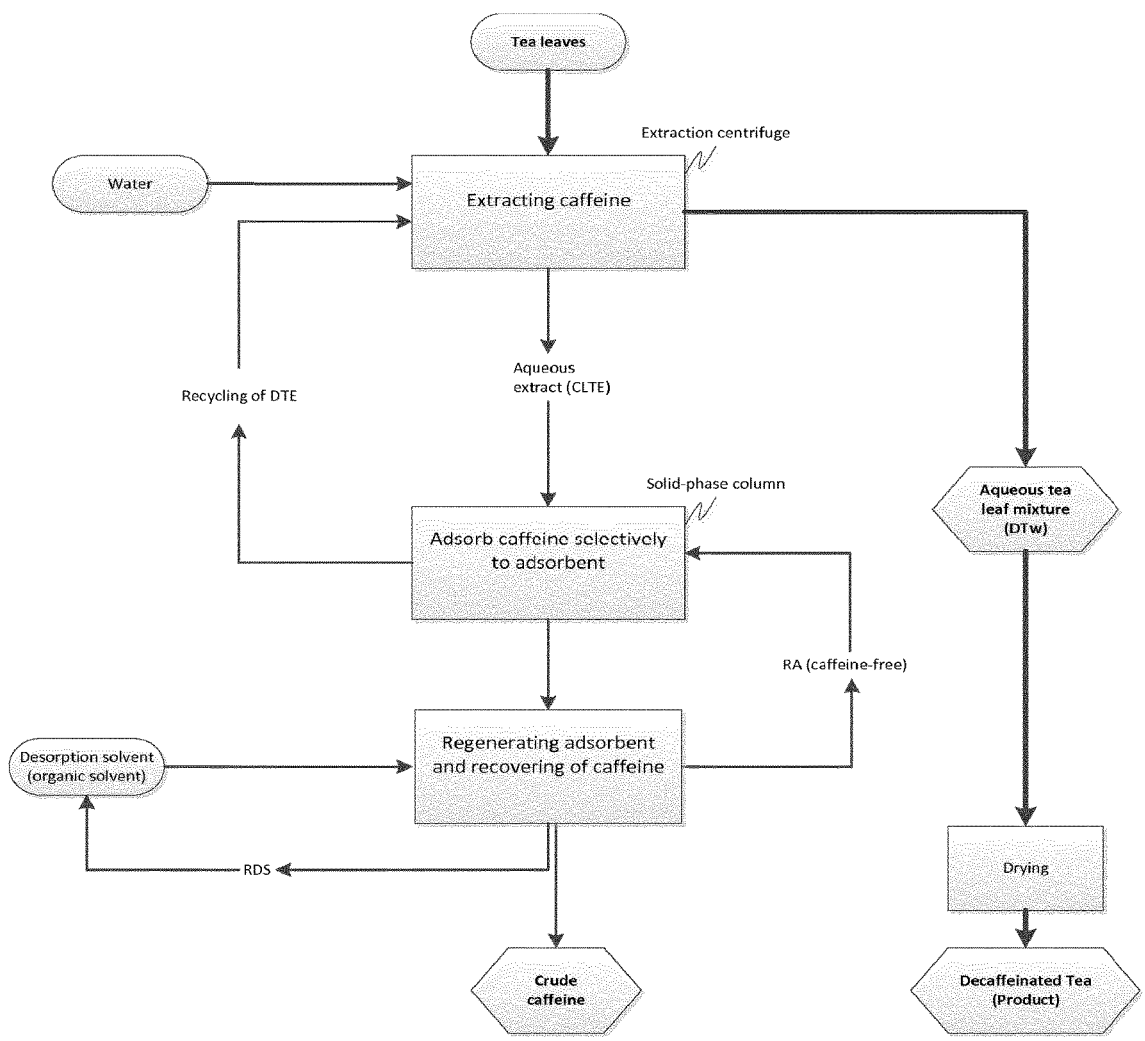
FIG. 1 is an example of a general process scheme for obtaining a decaffeinated tea product

The present invention discloses methods and systems for decaffeinating alkaloid containing substances. In most instances the caffeine removed can be recovered for further processing.

While certain embodiments of the present invention are directed at the decaffeination of any alkaloid containing substance, such as, but not limited to, tea leaves (fresh, dried, partially dried, oxidized or partially oxidized), coffee or maté, the majority of the embodiments of the present invention are directed at the decaffeination of tea leaves which have generally been dried after harvest.

In one embodiment, the invention is directed at a method for producing a decaffeinated tea product, such as decaffeinated tea leaves, comprising
  (i) adding water having preferably a temperature of less than 70° C. to tea leaves to form an aqueous tea leaf mixture,
  (ii) separating the tea leaves from said aqueous tea leaf mixture to obtain an aqueous extract and extracted tea leaves;
  (iii) contacting the aqueous extract of (ii) with an active carbon adsorbent (ACA);
  (iv) adsorbing caffeine in said extract reversibly to the ACA to obtain an aqueous decaffeinated tea extract (DTE),
  (v) contacting the aqueous DTE with the extracted tea leaves of (ii) to form a further aqueous tea leaf mixture, optionally, repeating (ii) to (iv) 2 to 12 or 4 to 10 times, and
  (vi) drying the further aqueous tea leaf mixture to obtain the decaffeinated tea product.

In a preferred embodiment the ACA and the caffeine adsorbed thereto may be desorbed and the ACA is contacted with a further aqueous extract.

The time between adding the water or DTE to form the aqueous tea leaf mixture in (i) or the further aqueous tea leaf mixture in (v) and separating the extracted tea leaves in (ii) may be more than 2 minutes, but less than 60 minutes, preferably between 2 and 20 minutes.

The ratio of the tea leaves to water in (i) may be 1:5 to 1:10, including 1:5 to 1:9, and 1:6 to 1:8.

The water or decaffeinated tea extract in (i) or the DTE of (v) may have a wide range of temperatures, e.g., less than 80° C. or, as noted above, less than 70° C. They may also be less than 60° C., preferably 5° C. to 60° C., preferably at 15° C. to 50° C. or 15° C. to 30° C. when mixed with said tea leaves or extracted tea leaves. The separating in (ii) may be centrifugal separating, e.g., in a continuous flow centrifuge or a solid-bowl centrifuge such as a countercurrent centrifuge or a concurrent centrifuge.

The tea leaves in (i) generally comprise non-caffeine water soluble components and the decaffeinated tea product in (vi) generally comprises non-caffeine water soluble components, wherein the decaffeinated tea product in (vi) may comprise at least about 50%, 60%, 70%, 80%, preferably 90% of the non-caffeine water soluble components of the tea leaves of (i).

The non-caffeine water soluble components may in particular be tea polyphenols (acting as taste components, but also as antioxidants) such as catechins and/or epicatechins (up to 30% of the dry weight of tea leaves in green tea), amino acids such as L-theanin, theaflavin, including theaflavin derivatives such as theaflavin-3-gallate, and/or thearubigine.

A solvent may be added to the ACA and the caffeine adsorbed thereto may be desorbed.

The desorbed caffeine may be recovered from the solvent and the solvent is optionally recirculated to the ACA. The caffeine may be dried by evaporation the solvent. The solvent may be an alcohol such as methanol or ethanol, or an ester such as ethyl acetate. Preferably more than 60%, 70%, 80%, 90%, 95% or 98% of the caffeine adsorbed is desorbed from said ACA and is dissolved in said solvent. I one embodiment the ACA is part of an adsorption column. The ACA may comprise, preferably round, porous carbon particles, wherein more than 90% of said particles have preferably a size range of 0.1 to 0.66 mm and a surface area of >1300 $m^2/g$.

The ACA has preferably an iodine number that is higher than 1350 mg/g.

The decaffeinated tea may be black tea or green tea (*Camellia sinensis* L.), or Maté tea (*Ilex paraguariensis* L.) At least 85%, 90 or 95% of the caffeine may be removed from the tea leaves and/or the caffeine remaining in the decaffeinated tea product does not exceed 0.4%, preferably 0.3%, more preferably 0.2% or 0.1%.

The invention is also directed to a decaffeinated tea product obtained via any of the methods described herein.

The decaffeinated tea product made from tea leaves may comprise less than 0.5%, preferably less than 0.4%, 0.3%, 0.2% or 0.1% of caffeine and at least 40%, 50%, 60%, 70%, 80% or 90% of tea catechins, theaflavin, including theaflavin derivatives such as theaflavin-3-gallate, tharubigine and/or polyphenols such as epicatechins of the tea leaves it is made from.

The invention is also directed at the use of an active carbon adsorbent comprising, preferably round, porous carbon particles with more than 90% of said particles having a size range of 0.1 to 0.66 mm, a surface area of >1300 $m^2/g$ and an iodine number that is higher than 1350 mg/g in the decaffeination of alkaloid containing substances, such as, but not limited to, tea, coffee or maté.

The invention is also directed at a system for decaffeinating alkaloid containing substances comprising:
- a continuous flow centrifuge or a solid-bowl centrifuge comprising an inlet and at least one fluid outlet and at least one solids outlet, and
- an adsorption column, wherein the adsorption column is functionally attached to one of said at least one fluid outlets and comprises an active carbon adsorbent comprising, preferably spherical or round, porous carbon particles with more than 90% of said particles having a size range of 0.1 to 0.66 mm, a surface area of >1300 $m^2/g$ and an iodine number that is higher than 1350 mg/g.

The invention is in certain embodiments directed at a kit for decaffeinating tea comprising: in one container a carbon adsorbent comprises, preferably spherical or round, porous carbon particles with more than 90% of said particles having a size range of 0.1 to 0.66 mm, a surface area of >1300 $m^2/g$ and an iodine number that is higher than 1350 mg/g in an adsorption column configured to adsorb caffeine from alkaloid containing substances and, in a second container, instructions of how to use the column in extracting alkaloid containing substances.

DETAILED DESCRIPTION OF VARIOUS AND PREFERRED EMBODIMENTS

The methods of the present invention involve water based extraction procedures. That is, alkaloid containing substances, in particular tea leaves are decaffeinated using water to extract caffeine.

The present invention aims at producing decaffeinated tea products, such as decaffeinated tea leaves, by extracting caffeine from tea leaves using water while retaining the remaining desirable components of the tea leaves in the final product. It is well known that the solubility of caffeine at low temperatures is low, e.g. 2% at 20 degrees Celsius, and increases significantly up to the boiling point of water. Thus, at 95 degrees Celsius, the solubility is 60%. The solubility of other components of tea such as polyphenols, aromatics and theanin similarly increases with temperature with the perfect temperature to prepare a tea brew for human consumption being 70 to 98 degrees Celsius.

However, the water of the present invention has a temperature of less than 70° C., less than 60° C., preferably between 5° C. to 60° C., preferably between 15° C. to 40° C. or between 15° C. to 30° C. The water may be recycled. A recycled form of the water means that water that went through at least part of the process or system of the present invention, that is, water that was previously added to tea leaves to create a tea leaf mixture, separated from those tea leaves and preferably subsequently contacted with an active carbon adsorbent (ACA), maybe used instead of fresh water. The recycled water that went through all of those processes (including adsorption of caffeine) is also referred to herein as decaffeinated tea extract (DTE). Generally, the water will be regular tap water or distilled water, but may contain additives such as buffer salts, organic acids, or other water soluble ingredients that are permitted as food additives.

The tea leaves admixed with the water create a tea leaf mixture. Prior to separating the tea leaves from the mixture up to 20 minutes may pass, including, up to 15, up to 10, up to 5 minutes. Generally, the mixture should stay admixed for at least 1 or 2 minutes. The separation of the tea leaves from the mixture may take place in a centrifuge, which may also function as a mixing chamber. Generally centrifuges are preferred that allow a separation between solids and liquids, such as continuous flow centrifuges and solid-bowl centrifuges. Particularly preferred are centrifuges which do not damage the sensitive tea leaf cells, and that are designed to minimize the mechanical impact on the tea leaves. Thus, the separation should generally take place at low g-forces in order to minimize the impact on the leaf structure. The g-force (with g from gravitational) is a measurement of acceleration felt as weight [$m/s^2$]. Low g-forces are in the range of 2-100, 2-50, preferably 5 to 40 $m/s^2$. The separation results in an aqueous extract and extracted tea leaves. Something is, in the context of the present invention, "aqueous" if it has a watery consistency, but contains, in addition to water further ingredients. The further ingredient may, but certainly do not need to be, truly dissolved in water or form a water based emulsion or a suspension. An aqueous mixture according to the present invention generally contains solids in form of tea leaves. Such an aqueous extract from which, if not all, the majority of tea leaves have been removed, is subject to adsorption.

In the context of the present invention, adsorption is the adhesion of atoms, ions and/or molecules from a liquid, or dissolved solid to a surface. This process creates a film of the adsorbate, here primarily caffeine, on the surface of the adsorbent. Adsorption is a surface-based process. The term sorption encompasses both adsorption and absorption, while desorption, which is also a surface phenomenon, is the reverse of adsorption.

In the present invention, caffeine can be reversibly adsorbed to an adsorbent. That means that the adsorbate, here caffeine, is first adsorbed to the adsorbent, but can be released form the adsorbent via a suitable solvent, e.g. an alcohol or ethyl acetate. The adsorbent has preferably high specificity for caffeine relative to its specificity for non-caffeine tea component, that is, the adsorbent adsorbs caffeine (which constitutes about 3% of the dry weight of tea), but to a much lesser extent non-caffeine water soluble tea leaf components, such as less than 20%, less than 10%, less than 5%, less than 5%, less than 3%, less than 2% of the total content of such other water soluble tea leaf components such as tea catechins (up to 30% of the dry weight of tea leaves in green tea), theaflavin derivatives, such as theaflavin-3-gallate, and/or other polyphenols. The saturation of the water (here DTE) with water soluble constituents other than caffeine has a positive influence on the extraction equilibria for these components out of the tea leaves. Generally, the further extraction of water soluble, non-caffeine, constituents is reduced, and both the higher concentration of these constituents in the DTE and the reduced extraction of these constituents out of the tea leaves lead to a higher content of these constituents in the final tea product.

During the extraction of solutes, here caffeine as well a non-caffeine water soluble components, into a solvent such as water/DTE, the solutes are moved from one phase (here the tea leaf phase) into the other phase (here water/DTE phase). Depending on the solubility of the solutes in the solvent and the extraction time, equilibrium will be achieved. At the beginning of the extraction (time t=0), the solutes are only in the tea leaf, but after some extraction time)(t=∞) the solute(s) is/are transported into the solvent and an equilibrium of the solute concentration in the tea leaf phase ($c'_\infty$) and the water phase ($c_\infty$) is achieved. Once the solvent is saturated with one or more solutes, no more exchange of the solute(s) between the two phases takes place.

As it is known to a person skilled in the art, the equilibrium of the solute(s) in both phases is explained by the distribution law of Nernst: "When a solute is taken up with two immiscible liquids, in both of which the solute is soluble, the solute distributes itself between the two liquids in such a way that the ratio of its concentration in the two liquid phases is constant at a given temperature provided the molecular state of the distributed solute is same in both the phases"

$$K = c(\text{phase 1})/c'(\text{phase 2})$$

where c' (leaf phase) and c (water/DTE phase) are the concentrations of the here water soluble solute(s) into the two phases. K is called distribution coefficient or partition coefficient.

Accordingly, an increased concentration of non-caffeine water soluble tea components in the DTE leads to a reduction of the extraction of non-caffeine water soluble tea components in the subsequent extractions/extraction steps from the tea leaf into the DTE, thus suppressing the loss of desirable non-caffeine water soluble tea components into the DTE, and maximizing their content in the decaffeinated tea leaves. Thus, in the last extractions (e.g., 3 to 5) of one batch of tea leaves with DTE the only solute that is still extracted at any significant rate is the caffeine for which the equilibrium has been disturbed by adsorption on the adsorbent. Thus, with each extraction of a batch of tea leaves with DTE $K_{(caffeine)}$ becomes larger then $K_{(soluble, non\text{-}caffeine, tea\ components)}$, with the ratio of $K_{(caffeine)}/K_{(soluble, non\text{-}caffeine, tea\ components)}$ being larger than 1, preferably larger then 2, 3, 4, 5, 6, 7, 8 in the $2^{nd}$, $3^{rd}$, $4^{th}$, $5^{th}$, $6^{th}$, $7^{th}$, $8^{th}$, $9^{th}$, $10^{th}$, $11^{th}$, or $12^{th}$ extraction of a batch of tea leaves with the DTE obtained from the previous extraction.

In the context of the present invention, an active carbon adsorbent (ACA) is used, which can be regenerated, this is, the caffeine can and generally is desorbed from the ACA via a solvent to create a regenerated ACA. A full regeneration may be achieved after a number of process cycles, e.g., after the production of more than 2, 3, 4, 5, 6, 7, 8, 9, 10, 11, 12, 13, 14, 15, 16, 17, 18, 19 or 20 batches of decaffeinated tea products by applying heat or steam, with or without applying a stream of gases such as nitrogen, oxygen or air, to remove firmly adsorbed components and to fully regenerate the ACA. The regenerated ACA is free (fully regenerated and initial solvent desorbed) or substantially free (solvent desorbed) of caffeine and can generally be used again to adsorb caffeine after a simple washing with water subsequent to solvent desorption.

The process of the present invention results in a decaffeinated product that is produced "solvent-free" and is "solvent-free", i.e., there is no direct contact of the alkaloid containing substances (including tea and coffee) with a solvent, not even the organic solvent, which is, in the context of the present invention, only used for regenerating the ACA and for the recovery of the caffeine.

Advantageously, the ACA comprises, porous carbon particles, which are preferably round and in certain embodiments spherical, preferably with more than 70%, preferably 80% or 90% of said particles having a size range of 0.05, to 1 mm, 0.1 to 1 mm, preferably, 0.1 to 0.75, most preferably 0.1 to 0.66 mm, a surface area of, >1100 m$^2$/g, >1200 m$^2$/g, preferably >1300 m$^2$/g and/or an iodine number that is higher than, 1200 mg/g, 1300 mg/g, preferably 1350 mg/g. Activated carbon is a generic term used for any carbonaceous material subjected to controlled thermal treatments, in order to increase the level of porosity. Owing to its high internal surface area and pore volume, activated carbon is a powerful adsorbent. Activated carbon is mainly produced by two-step process of carbonization followed by physical activation, but can also be produced in a single carbonization and chemical activation step. Carbonization refers to the stage at which organic substances convert to carbon containing residues (char) through a thermal process, in absence of oxygen. In the case of physical activation, carbonization is followed by gasification of char with oxidizing agents such as steam and $CO_2$. Chemicals such as $ZnCl_2$ and KOH can be used for chemical activation, often simultaneously with carbonization. Almost any organic material with high carbon content can be used to produce activated carbon. Historically, activated carbon has been made from wood, coal and animal origin materials such as bones. many agricultural by-products have been investigated to date for the production of activated carbon. Coconut shells, sawdust, rice husk, nutshell, cherry or date stones plum kernels, olive waste are some more recent material used to produce activated carbon adsorbents (ACAs), all of which can be used in the context of the present invention. US Patent application 2012/0172216 disclosing activated carbons which can be used as adsorbents is incorporated herein by reference in its entirety. In a preferred embodiment, the particles are made from a synthetic material such a polystyrene (see US Patent Publication 20040038802, U.S. Pat. Nos. 7,160,369 or 7,662,747, which are incorporated by reference herein in its entirety).

A round particle is a particle that appears substantially spherical, ergo ball shaped, when looked at with the naked eye. Round particles can be, but are not necessarily, spheres in the geometrical sense. Rather they appear ball shaped, but may deviate up to 5% or 10% from the form of a geometrical sphere. Surface indentations are the norm rather than the exception. In the literature, simple ball shaped particles are often referred to as spherical.

The adsorbent is preferably part of an adsorption column, which holds the adsorbent often in a cylindrical body and has an inlet at the top and an outlet at the bottom. The aqueous extract that is left after the tea leaves have been separated from the tea leaf mixture may be poured into the inlet of the column and a DTE, which is decaffeinated to different degrees, e.g., 40% in a first round and up to 99% after 6 to 12 rounds, is the effluent. Next to the temperature of the water and the composition of the tea leaves (which may, e.g. be ground prior to preparing the aqueous tea leaf mixture), column design will determine, how many, if any, repetitions (e.g., 1, 2, 3, 4, 5, 6, 7, 8, 9, 10, 11, 12, 13, 14, 15, 16) are required to obtain a suitable decaffeinated product, in particular a suitable decaffeinated tea product such as decaffeinated tea leaves. In a repetition a DTE obtained as effluent is used instead of water and extracted tea leaves are used instead of non-extracted, e.g., dried, tea leaves.

Generally, the ACA can be used multiple times to adsorb caffeine before the caffeine is desorbed, e.g., in between 10 and 200 times, 20 to 100 times or 20 to 50 times.

The system according to the present invention comprises a centrifuge and an adsorption column, which is designed in a way that the aqueous extract obtained after centrifugation is channeled into an inlet of the adsorption column. Thus, the liquid outlet of the centrifuge is connected to the inlet of the adsorption column, e.g., via a duct. As the person skilled in the art will readily realize, there might be multiple centrifuges and multiple adsorption columns. In one embodiment, each centrifuge is connected with one adsorption column. In a "continuous flow" embodiment, one centrifuge is assigned to more than one adsorption columns, so that the original adsorption column may, from time to time, be replaced by a regenerated adsorption column and the original adsorption column may be subjected to desorption and regeneration. As the person skilled in the art understands, there are many possible setups of the system. For example, in a discontinuous process, the connection between the centrifuge and the adsorption column may be interrupted, e.g., by a valve, and the process may be stopped while caffeine is desorbed from the adsorbent. Generally, the DTE is collected in one or more basins which are, in many cases, connected to a drying chamber that contains, after multiple times, extracted tea leaves, but may be also directly or indirectly connected to the centrifuge. The latter connection allows the DTE to be mixed again with extracted tea leaves to be subjected to further centrifugation and adsorption. In one embodiment the centrifuge may serve as a chamber for producing and maintaining a tea leaf mixture according to the present invention.

FIG. 1 is an example of a general process scheme for obtaining a decaffeinated tea product. In a first part of the process, also referred to as extraction, water (initially, later on DTE) and tea leaves are mixed. The caffeine is extracted from the tea leaves via the water including DTE rendering this process a water based extraction process. The extracted tea leaves whose caffeine content has been reduced are, in this embodiment, separated from the aqueous extract (the aqueous extract is in FIG. 1 referred to as "caffeine laden tea extract" (CLTE)). In the embodiment shown, the separation takes place via a flow-through centrifuge. In the embodiment shown, the aqueous extract (CLTE) is run over a solid-phase column comprising the active carbon adsorbent (ACA). The ACA adsorbs caffeine from the aqueous extract so that a decaffeinated tea extract (DTE) is obtained. The DTE is mixed with extracted tea leaves (in certain embodiments also with non-extracted tea leaves) in order to enrich the extracted tea leaves with soluble non-caffeine tea components that improve the quality of the decaffeinated tea product. As outlined above, with each repetition $K_{(caffeine)}/K_{(soluble,\ non-caffeine,\ tea\ components)}$ increases. There might be e.g. 2-12 or 6-12 of contacts with one batch of tea leaves with DTEs that stem from one initial batch of water that was added to the original batch of non-extracted tea leaves. Each exaction with DTE, is followed by, e.g., one, e.g., centrifugal, separation and, e.g., one contact with the ACA.

After such generally multiple contacts, the extracted tea leaves are one more time contacted with the DTE dried and the decaffeinated tea product is obtained. The ACA has been described elsewhere herein and allows desorption of the caffeine with a desorption solvent, which can be recycled and again run over the ACA to desorb caffeine that has been captured with the regenerated ACA. Preferably, a substantial portion (at least 90%, preferably at least 95%) of the caffeine adsorbed to the ACA is desorbed in a single solvent desorption step, i.e., a single elution.

As can be seen in the Figure, as a first step, an initial batch of water having, e.g., a temperature of 5 to 70 degrees Celsius is contacted with the tea leaves for 1 to 5 minutes. The ratio of water to tea leaves is, e.g., 1:1 to 1:10. During the 1 to 5 minutes the caffeine is extracted from the tea leaves as are other soluble non-caffeine tea components and an aqueous extract is obtained (CLTE). Those soluble non-caffeine tea components are desirable parts of the tea product. The extracted tea leaves generally require further extractions to reduce the caffeine content of the tea leaves to an acceptable level. On the other hand, the CLTE contains next to the caffeine desirable components. Thus, caffeine is removed from the CLTE and the resulting DTE is contacted again with the extracted tea leaves. As in any subsequent adsorption the caffeine content of the extracted tea leaves is reduced, the CLTE/DTE becomes more and more saturated in soluble non-caffeine tea components. This high saturation ensures that less and less of this soluble non-caffeine tea components move out of the tea leaves, while the removal of caffeine in the ACA ensures continuous removal of caffeine.

Caffeine is generally smaller than the soluble non-caffeine tea components such a polyphenols. Thus, the adsorbent can be designed to adsorb soluble non-caffeine components of tea preferentially so that the ACA "selective" for caffeine, i.e., it will adsorb more caffeine then non-caffeine soluble tea components. Preferably more than 90%, preferably 95% of the molecules adsorbed are caffeine molecules.

As described elsewhere herein the ACA can be regenerated with a solvent and preferably more than 70%, more than 80%, more than 90% and more than 95% of the caffeine adsorbed is desorbed via a preferably organic solvent. During regeneration/desorption, the ACA is taken out of the caffeine adsorption cycle and only put back into the cycle after regeneration (see "IRA" (caffeine free) (see also FIG. 2). The desorption solvent can be recycled (RDS).

Figure 2:
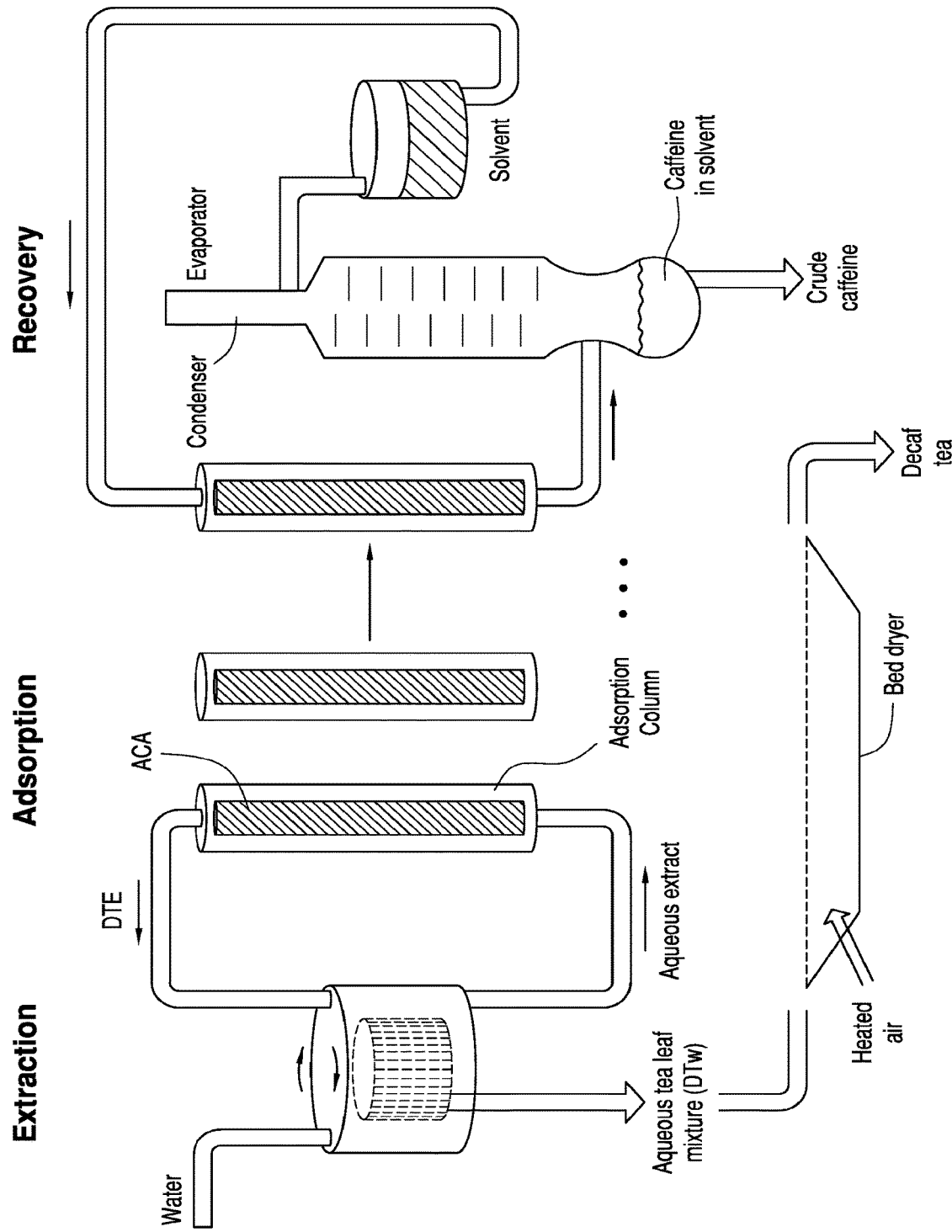
FIG. 2 shows an example of a system for decaffeinating alkaloid containing substances.

FIG. 2 shows an example of a system for decaffeinating alkaloid containing substances. The depicted system comprises an extraction vessel containing tea leaves (e.g. dust, fannings, broken or whole, dried or partially dried/oxidized tea leaves). A centrifuge may also serve as the extraction vessel. However, as the person skilled in the art will appreciate, the centrifuge may also be a separate structure that follows the extraction vessel. The extraction vessel will have an inlet for water, and optionally a separate inlet for the DTE as well as an opening to introduce the tea leaves. If the centrifuge is separate from the extraction vessel, the centrifuge preferably has at least one inlet for the aqueous tea leaf mixture and at least two outlets, one for the extracted tea leaves and one for and one for the aqueous extract.

If the extraction vessel and the centrifuge are one unit, this unit preferably comprises the above mentioned inlets of the extraction vessel as well as the above mentioned outlets of the centrifuge. Generally, the tea leaves stay in the extraction vessel/centrifuge for a number of extractions, first with water and then with DTE. After a number of extractions the aqueous tea leaf mixture is channeled into, e.g., a bed dryer as shown in FIG. 2 and any liquids in the mixture are dried off. The aqueous extract obtained after each centrifugation is contacted with the ACA ("adsorption") and DTE is obtained which is recycled for the further extraction of the tea leaves in the extraction vessel/centrifuge. After, e.g. the extraction of one batch of tea leaves, via e.g., 12 extractions, the ACA is taken out of the extraction/adsorption cycle shown and transferred into a the recovery cycle for recovery of the caffeine. In a system supporting a semi-continuous or continuous process, more than one ACA column is part of the system, preferably at least 2 for each extractor/centrifuge. In the recovery cycle, the ACA column is eluted with a solvent which is preferably introduced at the top of the column while the bottom of the column is attached to an evaporator in which the caffeine laden solvent is evaporated. The evaporated solvent is in this embodiment collected in a separate container for reuse in eluting an ACA column. The ACA might be fully regenerated from time to time by a heater which may or may not be part of the system. Crude caffeine is collected at the bottom of the evaporator for further processing.

The above are non-limiting examples of the claimed system and method. The person skilled in the art will be able to readily devise alternative embodiments that are within the scope of the invention as claimed.

What is claimed is:

1. A water based method for producing decaffeinated tea leaves comprising:
   (i) adding water having a temperature of less than 70° C. (degrees Celsius) to tea leaves to form an aqueous tea leaf mixture;
   (ii) separating the tea leaves from the aqueous tea leaf mixture to obtain an aqueous caffeinated laden tea extract;
   (iii) contacting the aqueous caffeinated laden tea extract of (ii) with an active carbon adsorbent (ACA);
   (iv) adsorbing caffeine in the aqueous caffeinated laden tea extract to the ACA to obtain an aqueous decaffeinated tea extract (DTE);
   (v) contacting the aqueous DTE of (iv) with new tea leaves to extract caffeine from the new tea leaves, wherein
   the contacting of the aqueous DTE with the new tea leaves forms a new aqueous tea leaf mixture, and
   (i) to (v) are water-based;
   (vi) separating the new tea leaves from the new aqueous tea leaf mixture to form caffeine extracted tea leaves and a new caffeinated laden tea extract; and
   (vi) drying the caffeine extracted tea leaves to obtain the decaffeinated tea leaves.

* * * * *